United States Patent
Furuse et al.

(10) Patent No.: US 6,827,327 B2
(45) Date of Patent: Dec. 7, 2004

(54) FLOW RESISTANCE SETTING NOZZLE (75) Inventors: Akio Furuse, Tokyo (JP); Atsushi Sato, Tokyo (JP)

(73) Assignee: Cosmo Instruments Co., Ltd., Tokyo (JP)

( * ) Notice: Subject to any disclaimer, the term of this patent is extended or adjusted under 35 U.S.C. 154(b) by 0 days.

(21) Appl. No.: 10/612,103

(22) Filed: Jul. 1, 2003

(65) Prior Publication Data
US 2004/0004137 A1 Jan. 8, 2004

(30) Foreign Application Priority Data
Jul. 2, 2002 (JP) ........................................ 2002-193356

(51) Int. Cl.[7] ................................................ F16K 7/06
(52) U.S. Cl. ........................... 251/8; 251/205; 239/569; 239/586
(58) Field of Search ......................... 138/45, 56; 251/8, 251/7, 205; 239/580, 569, 586, 576

(56) References Cited

U.S. PATENT DOCUMENTS

| 4,191,359 | A | * | 3/1980 | Andersson et al. | ......... 251/205 |
|---|---|---|---|---|---|
| 4,257,446 | A | * | 3/1981 | Ray | ............................. 251/8 |
| 4,824,085 | A | * | 4/1989 | Buchler | ...................... 269/139 |
| 5,013,006 | A | * | 5/1991 | Furuse | .......................... 251/8 |

FOREIGN PATENT DOCUMENTS

JP           542283           10/1993

* cited by examiner

Primary Examiner—Michael Mar
Assistant Examiner—Seth Barney
(74) Attorney, Agent, or Firm—David N. Lathrop; Gallagher & Lathrop (57) ABSTRACT

A flow resistance setting nozzle capable of easily setting a target flow rate is provided. A metallic block has a through-bore through which a flow path forming metallic pipe is inserted. A pressing member in the form of a rectangular cross-section bar abuts the pipe at a first abut portion. An anvil having a distal end with an arcuate surface is mounted to the metallic block such that the distal end abuts the pipe at a second abut portion that is opposite to the first abut portion. A coarse adjustment screw presses a center portion of the pressing member against the pipe to squeeze the pipe between the pressing member and the anvil to form an orifice in the pipe. Two fine adjustment screws impart a force to the pressing member to further squeeze the pipe until the target flow rate is set.

17 Claims, 9 Drawing Sheets

FLOW RESISTANCE SETTING NOZZLE

BACKGROUND OF THE INVENTION

1. Field of the Invention

This invention relates to a flow resistance setting nozzle which may be set at a reference flow rate to be used for calibration of a flow measuring device, for example, and particularly contemplates providing a flow resistance setting nozzle which facilitates setting flow values and yet may maintain a particular set flow value for a long period of time to provide a highly reliable reference flow rate.

2. Description of the Related Art

Figure 6:
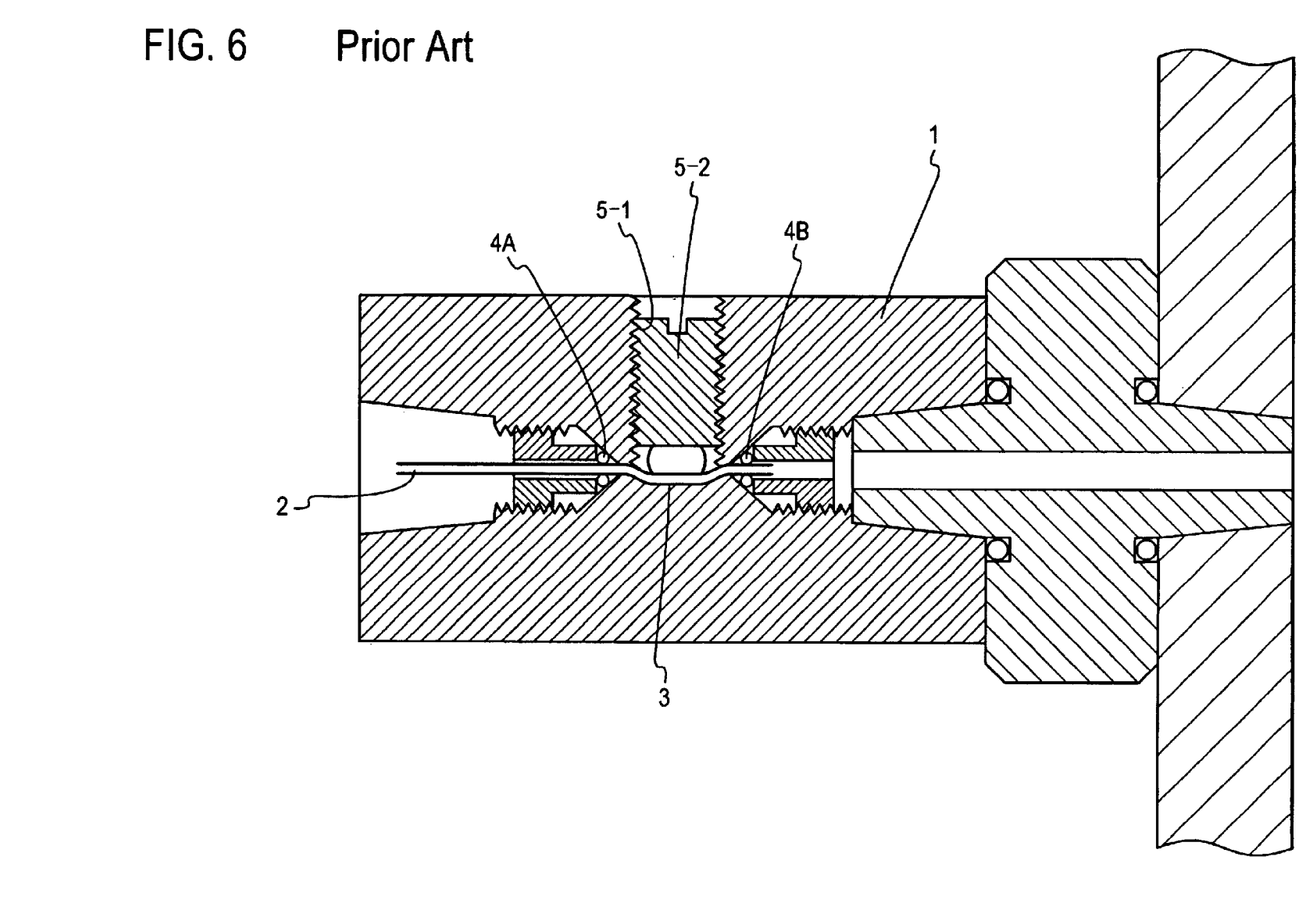
FIG. 6 is a cross-sectional view illustrating the known prior art flow resistance setting valve.

The present inventors have heretofore proposed various flow resistance setting valves. One example of such valves illustrated in FIG. 6 shows a flow resistance setting valve proposed as "micro-leak valve" in Japanese Utility Model Publication No. 5-42283 assigned to the same assignee of the present application. This flow resistance setting valve comprises a metallic block 1 having a tube receiving through-bore 3 for receiving a narrow tube 2 therethrough and a threaded hole 5-1 formed in the block so as to intersect the tube receiving through-bore 3 at a right angle, seal members 4A and 4B for forming seals between the outer periphery of the narrow tube 2 passed through the tube receiving through-bore 3 and the inner wall of the tube receiving through-bore 3, and a screw 5-2 threaded in the threaded hole 5-1, the arrangement being such that the narrow tube 2 can be squeezed by an appropriate amount by the screw 5-2 to set the cross-sectional area of the hollow bore of the narrow tube 2 at an appropriate value, whereby the flow of the gas which is allowed to pass through the narrow tube 2 may be restricted to obtain a desired reference flow rate.

Figure 7:
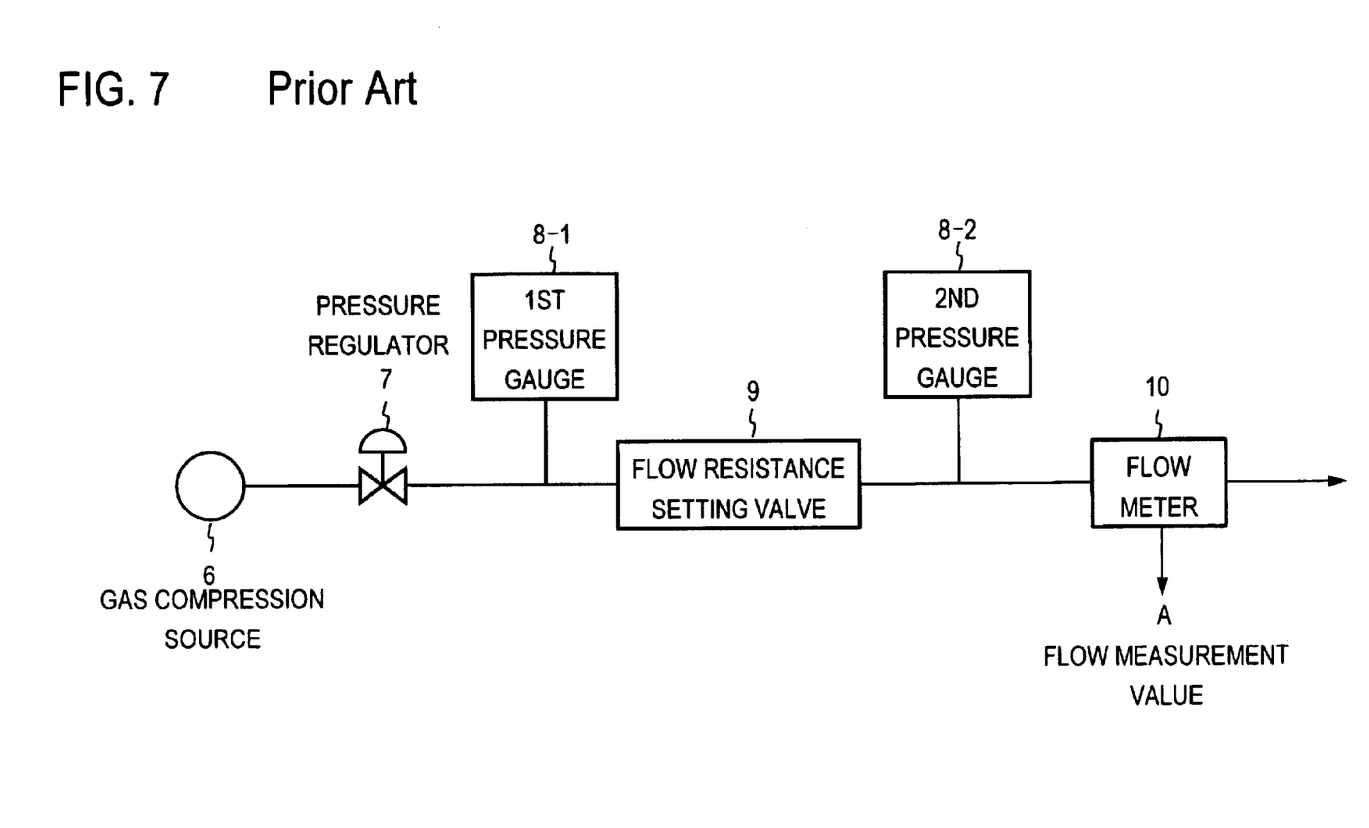
FIG. 7 is a block diagram illustrating the known prior art flow resistance setting valve in practical use.

With reference to FIG. 7, an example of this flow resistance setting valve in practical use will be explained. In FIG. 7 shown is a gas compression source 6 such as a compressor. The pressure of the gas compressed in the gas compression source 6 is regulated by a pressure regulator 7. The thus regulated gas pressure is governed by a pressure gauge 8-1 to be set at a constant gas pressure (primary pressure). The gas at the primary pressure is then provided to a flow resistance setting valve 9 as described with reference to FIG. 6. A secondary pressure of the gas output from the flow resistance setting valve 9 is measured at a second pressure gauge 8-2. When the pressure ratio of the secondary pressure to the primary pressure falls below a certain value, the velocity of flow of the gas passing through the restricted orifice of the flow resistance setting valve 9 will be equal to the sonic speed, and the gas is then provided at a constant restricted flow rate to a flow meter 10 to be calibrated. If the flow measurement value A of the flow meter 10 under calibration is calibrated so as to coincide with the flow rate set at the flow resistance setting valve 9, it means that calibration of the flow measurement value of the flow meter 10 under calibration is completed.

As is appreciated from the foregoing, the heretofore proposed flow resistance setting valve described above is configured to use the screw 5-2 for setting the flow rate. That is, the threaded amount of the screw 5-2 is adjusted to squeeze the narrow tube 2 so as to throttle the cross-sectional area of the narrow tube 2 whereby the flow rate of gas flowing at a predetermined given pressure may be set at a desired value.

With an increase in the threaded amount of the screw 5-2, the flow rate value is correspondingly turned down. However, if the flow rate value exceeds a target value by even a slight amount, the narrow tube 2 has to be replaced with a new one for readjusting the flow rate since the tube cannot be restored once it has been deformed. In this respect, it is to be appreciated that the prior art valve has the disadvantage that it is troublesome to set the flow rate.

In addition, the screw 5-2 takes the form of a screw commonly known as a kind of socket screw or socket set screw which is to be adjusted in position within the threaded hole 5-1. This is a type specifically designed in order to allow the threaded hole 5-1 to be sealed after completion of adjustment of the flow rate value, to thereby prevent the setting of the flow resistance from being easily tampered with once the flow rate has been set. It is for this reason that a set screw is used as the screw 5-2. However, the threaded shank of the set screw cannot be extremely reduced in diameter since the end face of the threaded shank is provided with a driver engagement groove engageable by a driver for turning the set screw for adjustment. In other words, the set screw usually has a relatively large diameter. Since as is known in the art the pitch of threads becomes more coarse with an increase in the diameter of the screw, it will be appreciated that it would be a difficult operation to set the flow rate at a target value by adjusting the screw 5-2 in the form of a set screw.

SUMMARY OF THE INVENTION

It is an object of this invention to provide a new flow resistance setting nozzle that is improved in easily and finely adjusting its flow rate to a desired target value.

In accordance with a first aspect of the present invention, a flow resistance setting nozzle is provided which comprises a metallic block having formed therethrough a pipe receiving through-bore; a metallic pipe for forming a flow path which is inserted in the pipe receiving through-bore; a pressing member in the form of a rectangular cross-section bar orthogonally abutting at a center position thereof with the pipe at a first abut portion thereof; a coarse adjustment screw mounted in the metallic block to press the pressing member at the center position thereof against the metallic pipe by a coarse pressing force generated by the coarse adjustment screw; an anvil having a distal end and mounted in the metallic block at a position opposite to the coarse adjustment screw such that the distal end of the anvil abuts the metallic pipe at a second abut portion thereof which is opposite to the first abut portion where the pipe abuts with the pressing member so that the pipe is received by and interposed between the pressing member and the anvil, whereby the pipe is squeezed by a coarse amount according to the coarse pressing force generated by the coarse adjustment screw; two fine adjustment screws mounted in the metallic block to press the pressing member at two symmetrically distant positions thereof which locate with substantially equal distances in longitudinally opposite directions of the pressing member from the center position thereof against the metallic pipe by a fine pressing force which is obtained from combination of respective pressing forces generated by the respective fine adjustment screws and which is additive to the coarse pressing force generated by the coarse adjustment screw, whereby the pipe is further squeezed by a fine amount according to the fine pressing force; and seal means for forming seals between the outer peripheral surface of the metallic pipe and the inner peripheral wall of the pipe receiving through-bore formed in the metallic block.

In accordance with a second aspect of the present invention, it is proposed in the flow resistance setting nozzle constructed according to the first aspect of the invention that the metallic block has a pressing member receiving bore which is formed therein to orthogonally intersect the pipe receiving through-bore, and that the pressing member is inserted in the pressing member receiving bore such that the pressing member orthogonally abuts with the metallic pipe at the first abut portion.

In accordance with a third aspect of the present invention, it is proposed in the flow resistance setting nozzle constructed according to the first or second aspect of the invention that each of the fine adjustment screws has a head portion and a threaded shank portion, that the pressing member has two through-apertures which are formed therethrough at the two symmetrically distant positions thereof for loosely receiving the threaded shank portions of the corresponding fine adjustment screws therethrough, and that the metallic block has two threaded holes which are coaxial with the two through-apertures and in which the threaded shank portions of the corresponding fine adjustment screws are threaded; whereby the fine pressing force is obtained from the combination of the respective pressing forces imparted by the head portions of the fine adjustment screws to the pressing member as the threaded shank portions of the fine adjustment screws loosely fitted in the through-apertures of the pressing member are threaded into the threaded holes in the metallic block.

In accordance with a fourth aspect of the present invention, it is proposed in the flow resistance setting nozzle constructed according to the third aspect of the invention that each of the threaded shank portion of the fine adjustment screws has a diameter smaller than that of a threaded shank portion of the coarse adjustment screw.

In accordance with a fifth aspect of the present invention, it is proposed in the flow resistance setting nozzle constructed according to either the first or second aspect of the invention that the distal end of the anvil has an arcuate surface with a top ridge thereof oriented in a direction orthogonal to the longitudinal direction of the pipe so that the arcuate surface of the anvil intersects the cylindrical peripheral surface of the pipe as the second abut portion.

In accordance with a sixth aspect of the present invention, it is proposed in the flow resistance setting nozzle constructed according to any of the first to fifth aspects of the invention that the metallic block has a coarse threaded hole and two screwdriving apertures formed therein, and that the respective head portions of the coarse adjustment screw and the two fine adjustment screws are recessed in the coarse threaded hole and the two screwdriving apertures formed in the metallic block, respectively.

In the flow resistance setting nozzle constructed according to the present invention, the provision of the fine adjustment screws in addition to the coarse adjustment screw facilitates the setting of the flow rate.

Further, in the flow resistance setting nozzle according to the present invention wherein the distal end of the anvil is provided with an arcuate surface oriented in a direction orthogonal to the cylindrical surface of the pipe, the restricted orifice portion of the pipe is progressively constricted axially of the pipe up to the most constricted section with a distance MS and then progressively expanded. Due to this orifice construction, the gas flowing through the pipe is allowed to pass the orifice smoothly to thereby attain a sonic flow rate value. In other words, the phenomenon in which the flow speed of the fluid reaches the sonic velocity at the restricted orifice to maintain a constant flow rate level if the pressure level on the primary side is set at a level above a predetermined value while the pressure level on the secondary side is set at a level below the predetermined value, is obtained.

It is thus to be understood that this invention allows for reproducing a highly reliable reference flow rate.

BRIEF DESCRIPTION OF THE DRAWINGS

FIGS. 1A and 1B are cross-sectional views illustrating one embodiment of the flow resistance setting nozzle according to this invention taken along the plane containing the X and Y axes and perpendicular to the plane of the drawing and looking in the direction B in FIG. 2, wherein FIG. 1A is taken along the plane containing the X and Y axes and perpendicular to the plane of the drawing and looking in the direction 1A in FIG. 3A to show the condition prior to a coarse adjustment operation is conducted by the use of the pressing member while FIG. 1B is taken along the plane containing the X and Y axes and perpendicular to the plane of the drawing and looking in the direction 1B in FIG. 3B to show the condition after the coarse adjustment operation has been conducted by the use of the pressing member.

FIGS. 3A, 3B and 3C are cross-sectional views taken along the plane containing the Y and Z axes and perpendicular to the plane of the drawing and looking in the direction A in FIG. 2, wherein FIG. 3C shows the condition after a fine adjustment operation has been conducted.

DETAILED DESCRIPTION OF THE INVENTION

An embodiment of the flow resistance setting nozzle according to this invention is illustrated in FIGS. 1A–5, in which the like reference numerals and characters designate the like elements. In the drawings, 1 is a metallic block which is shown in the illustrated example as comprising two block pieces 1A and 1B coupled together by screws 1. The metallic block 1 has a pipe receiving through-bore 11 formed therethrough.

12 indicates a pipe inserted in the pipe receiving through-bore 11, and 4 indicates seal members (O-rings) for forming seals between the outer peripheral surface of the pipe and the inner wall 11BB of the pipe receiving through-bore 11.

The pipe receiving through-bore 11 extends through the metallic block perpendicularly to the mating plane 1D of the two divided block pieces 1A and 1B, and the pipe 12 is inserted in the bore 11 on the central axis X thereof.

The pipe receiving through-bore 11 comprises an inlet bore section 11A having an inlet 11BA, an outlet bore section 11B having an outlet 11BB, a central bore section 11C, a first intermediate bore section 11D extending between the inlet bore section 11A and the central bore section 11C, and a second intermediate bore section 11E extending between the outlet bore section 11B and the central bore section 11C.

The first and second intermediate bore sections 11D and 11E are reduced in their inner diameters to the extent that they are only slightly larger than the outer diameter of the pipe 12.

The inlet bore section 11A and the outlet bore section 11B have tapered portions 11AB and 11BB, respectively progressively increasing in diameter as they extend from the first and second intermediate bore section 11D, 11E and inner threaded portions 11AC and 11BC, respectively extending between the tapered portions 11AB and 11BB and the corresponding inlet 11AA and outlet 11BA.

In the inlet bore section 11A and the outlet bore section 11B, seal members (O-rings) 4 are fitted around the pipe 12 and then attachments 19 having outer threads engageable with the inner threaded portions 11AC and 11BC are fitted around the pipe 12 outside of the seal members 4. Then, the attachments 19 are threaded into the inlet bore section 11A and the outlet bore section 11B to clamp the seal members (O-rings) 4 between the outer periphery of the pipe 12 and the inner walls of the tapered portions 11AB and 11BB of the pipe receiving through-bore 11 to thereby form seals between the pipe and the inner wall of the through-bore 11. In this way, the pipe 12 is completely sealed off from the central bore section 11C which is in communication with the outside air, whereby the pipe 12 defines a flow path so that all of the gas supplied from the inlet 11AA of the pipe receiving through-bore 11 is passed through the pipe 12 and discharged from the outlet 11BA.

Figure 1A:
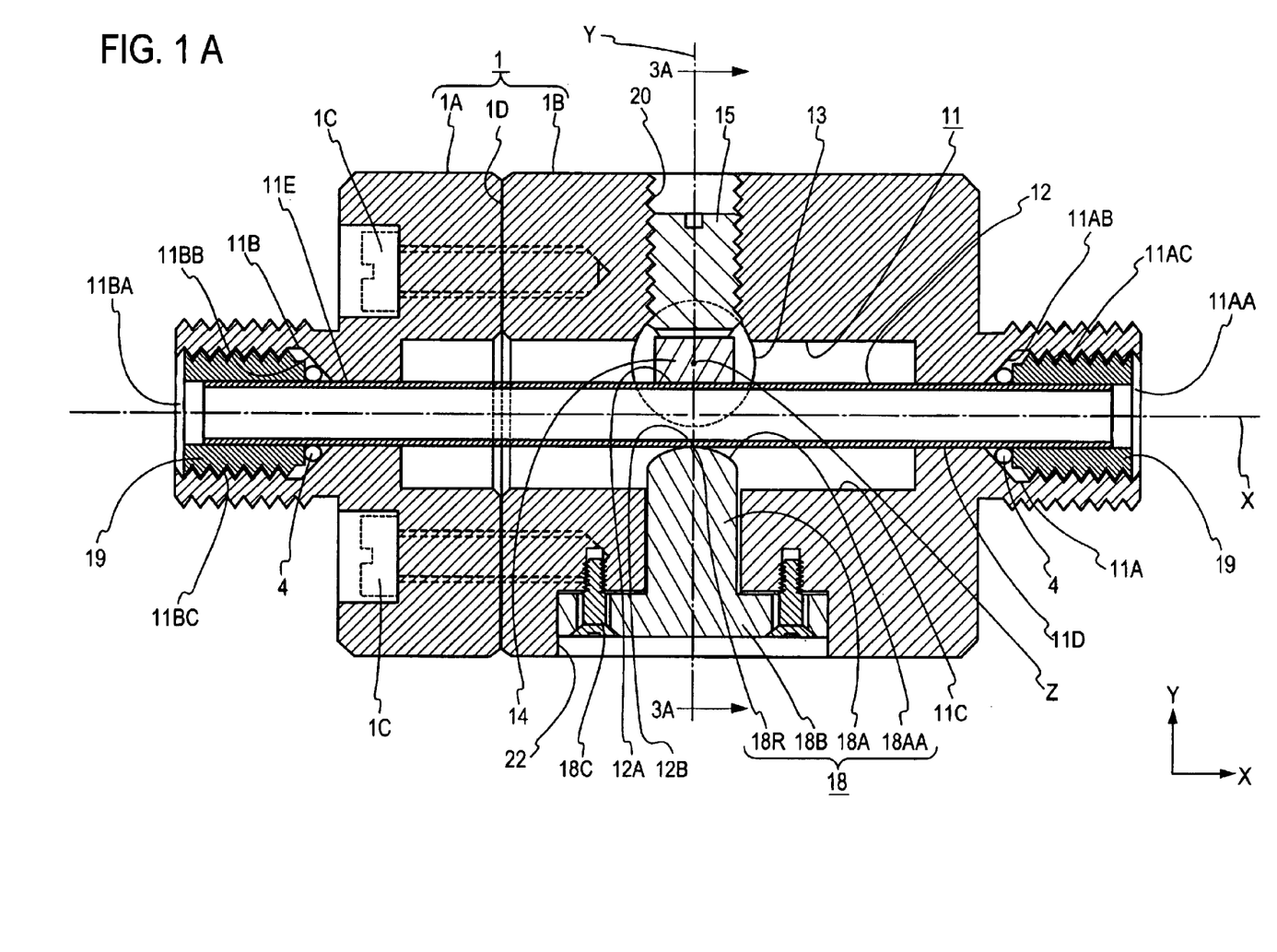

The metallic block 1 is further formed therethrough with a pressing member receiving bore 13 extending in a direction (Z-axis direction) orthogonal to the pipe receiving through-bore 11 (X-axis direction). The central Z axis of the pressing member receiving bore 13 is offset in the Y-axis direction from the central X axis of the pipe receiving through-bore 11 as shown in FIG. 1A, but the two bores are in communication with each other at the point of intersection of the two as seen in FIGS. 1A–1B, and 3A–3C.

Figure 4A:
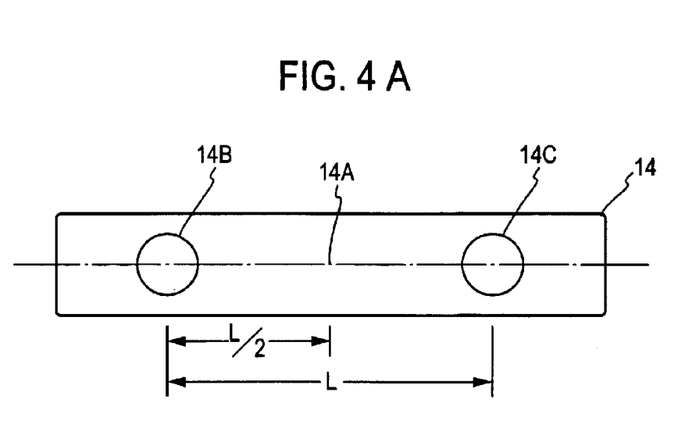
FIG. 4A is a plan view illustrating the construction of the pressing member for use in the present invention.
Figure 4B:
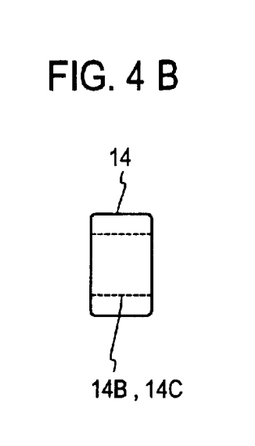
FIG. 4B is a side view of the pressing member.

A pressing member 14 is inserted in the pressing member receiving bore 13. As shown in FIGS. 4A and 4B, the pressing member 14 is formed of a rectangular cross-section metallic bar and has transverse through-apertures 14B and 14C formed therethrough at symmetrically distant positions which locate with substantially equal distances in longitudinally opposite directions of the pressing member from the center position thereof.

In addition, the metallic block 1 is formed with a threaded hole 20 through which a coarse adjustment screw 15 is to be threaded, and two screwdriving apertures 21 through which two fine adjustment screws 16 are inserted to be screw-driven at symmetrically distant positions which locate with substantially equal distances from the threaded hole 20, both the threaded hole 20 and the screwdriving apertures 21 extending in parallel to each other in Y-axis direction to orthogonally intersect to and communicate with the pressing member receiving bore 13.

Figure 2:
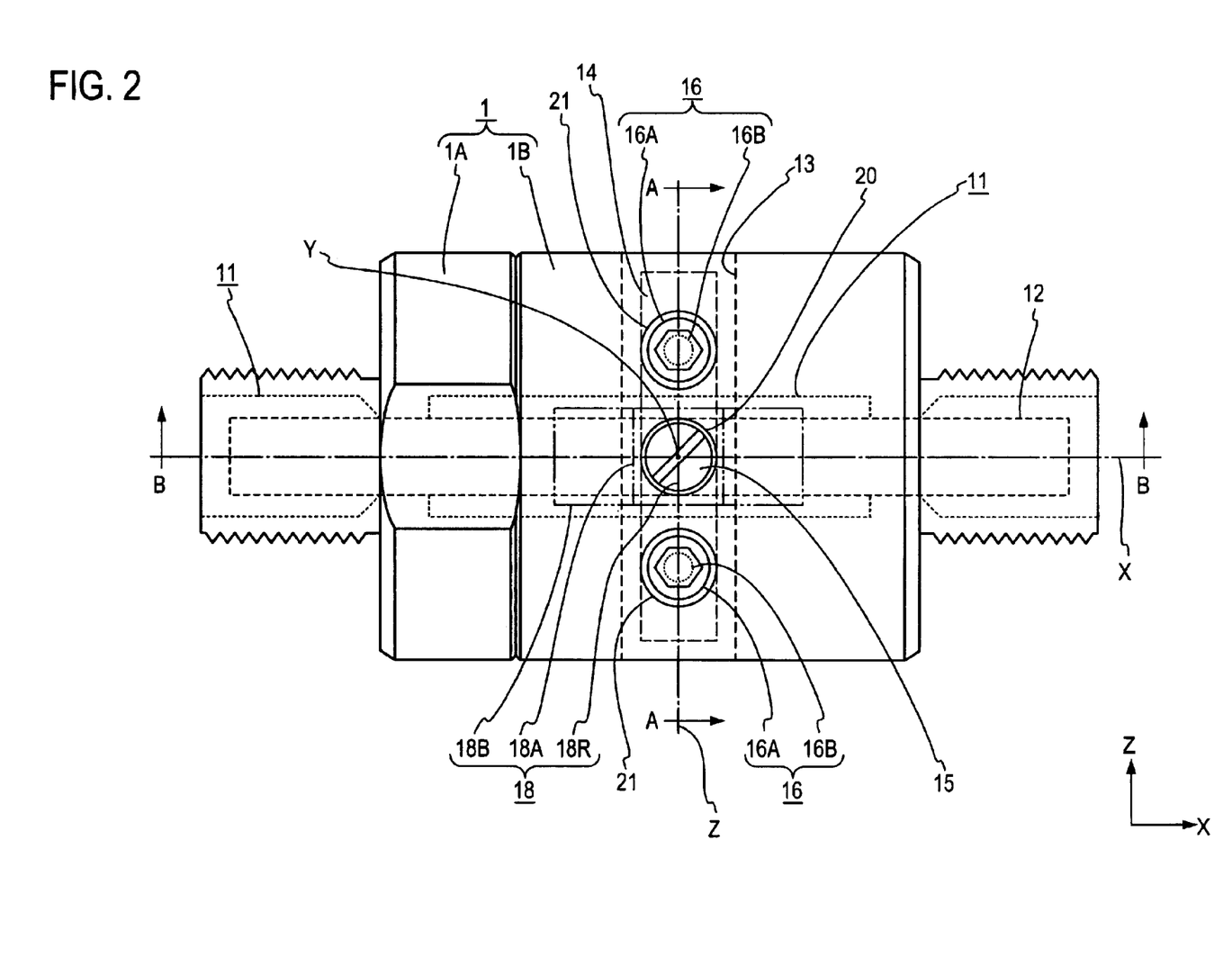
FIG. 2 is a plan view of the embodiment shown in FIGS. 1A and 1B.
Figure 3A:
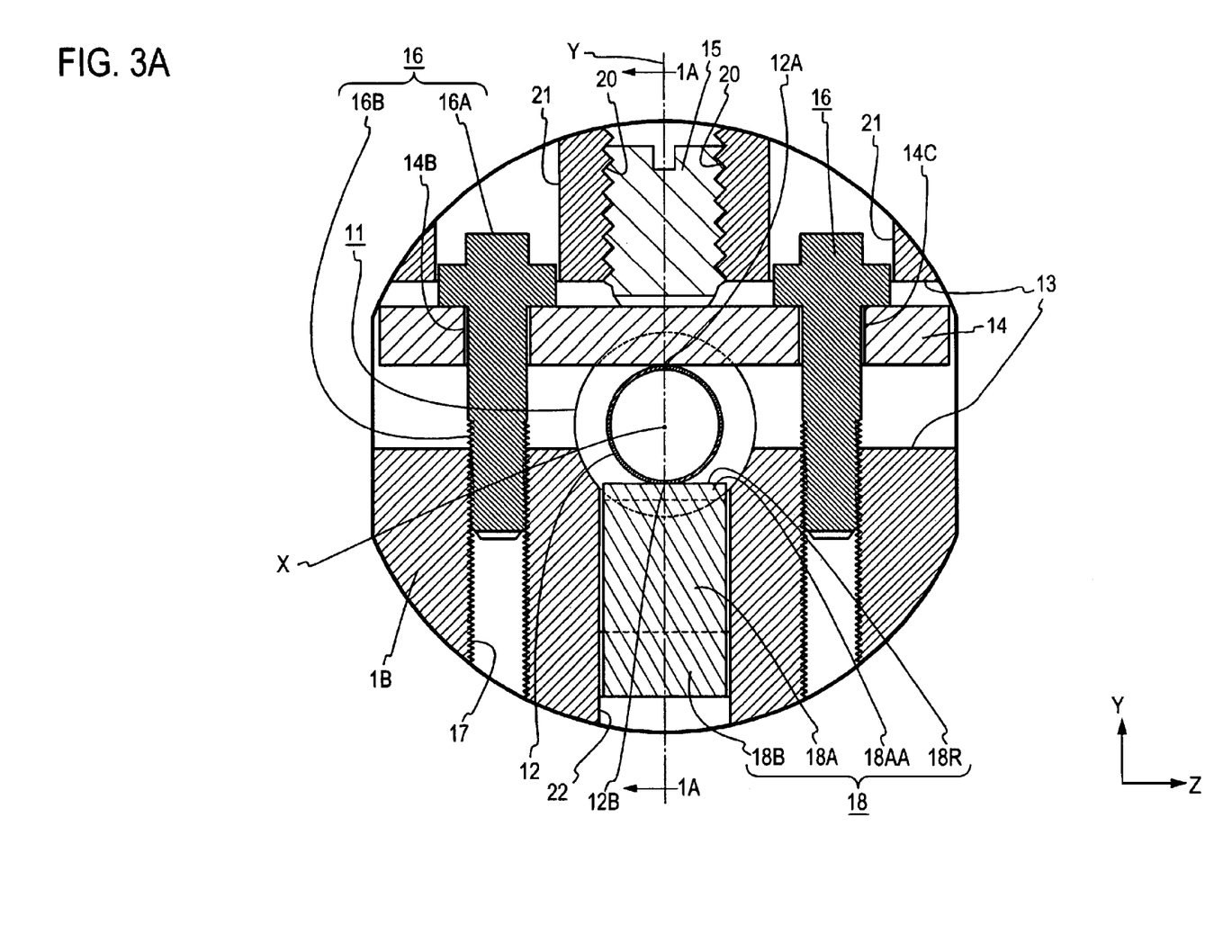
FIG. 3A is taken along the plane containing the Y and Z axes and perpendicular to the plane of the drawing and looking in the direction 3A in FIG. 1A to show the condition prior to the coarse adjustment operation is conducted.

As shown in FIG. 3A, the pressing member 14 is inserted in the pressing member receiving bore 13 in a manner such that it rests on the upper outer peripheral surface of the pipe 12 transversely thereof, that the central axis Y of the threaded hole 20 in which the coarse adjustment screw 15 is threaded intersects orthogonally to the pressing member 14 at the center position 14A thereof and the longitudinal axis X of the pipe 12 (see FIG. 2).

The distances from the two screw driving apertures 21 formed in the metallic block piece 1B with the threaded hole 20 located therebetween to the threaded hole 20 are made equal to the distances from the corresponding two through-apertures 14B and 14C formed in the pressing member 14 to the central position 14A of the pressing member 14.

The through-apertures 14B and 14C formed in the pressing member 14 inserted in the pressing member receiving bore 13 are located in opposition to the corresponding fine-tuning screw driving apertures 21.

With this arrangement, the centers of the distal end of the coarse adjustment screw 15 threaded in the threaded hole 20 is brought into pressure contact with the pressing member 14 at its center position 14A to urge the latter against the pipe 12 at a first abut portion 12A thereof (This situation is shown in FIG. 3A.)

In addition, threaded holes 17 into which corresponding fine adjustment screws 16 are to be threaded are formed in the metallic block 1 in opposition to and coaxially with the corresponding two screwdriving apertures 21 with the pressing member receiving bore 13 located therebetween.

The fine adjustment screws 16 each includes a head portion 16A and a threaded shank portion 16B. The diameter of the through-apertures 14B and 14C formed in the pressing member 14 is oversized relative to the diameter of the threaded shank portions 16B of the fine adjustment screws 16, while the head portion of the screw 16 is oversized relative to the diameter of the through-apertures 14B and 14C, so that the threaded shank portion of the screws 16 can be loosely passed through the associated screwdriving apertures 21 and the through-apertures 14B, 14C in the pressing member 14 and cross the pressing member receiving bore 13 while the head portion cannot be passed, so that the threaded shank portions 16B is threaded into the opposed threaded holes 17 (see FIGS. 3A–3C) whereby the head portions 16A of the fine adjustment screws 16 are brought into pressure engagement with the pressing member 14 to urge the latter against the pipe 12 to thereby accomplish the fine adjustment operation.

Figure 3B:
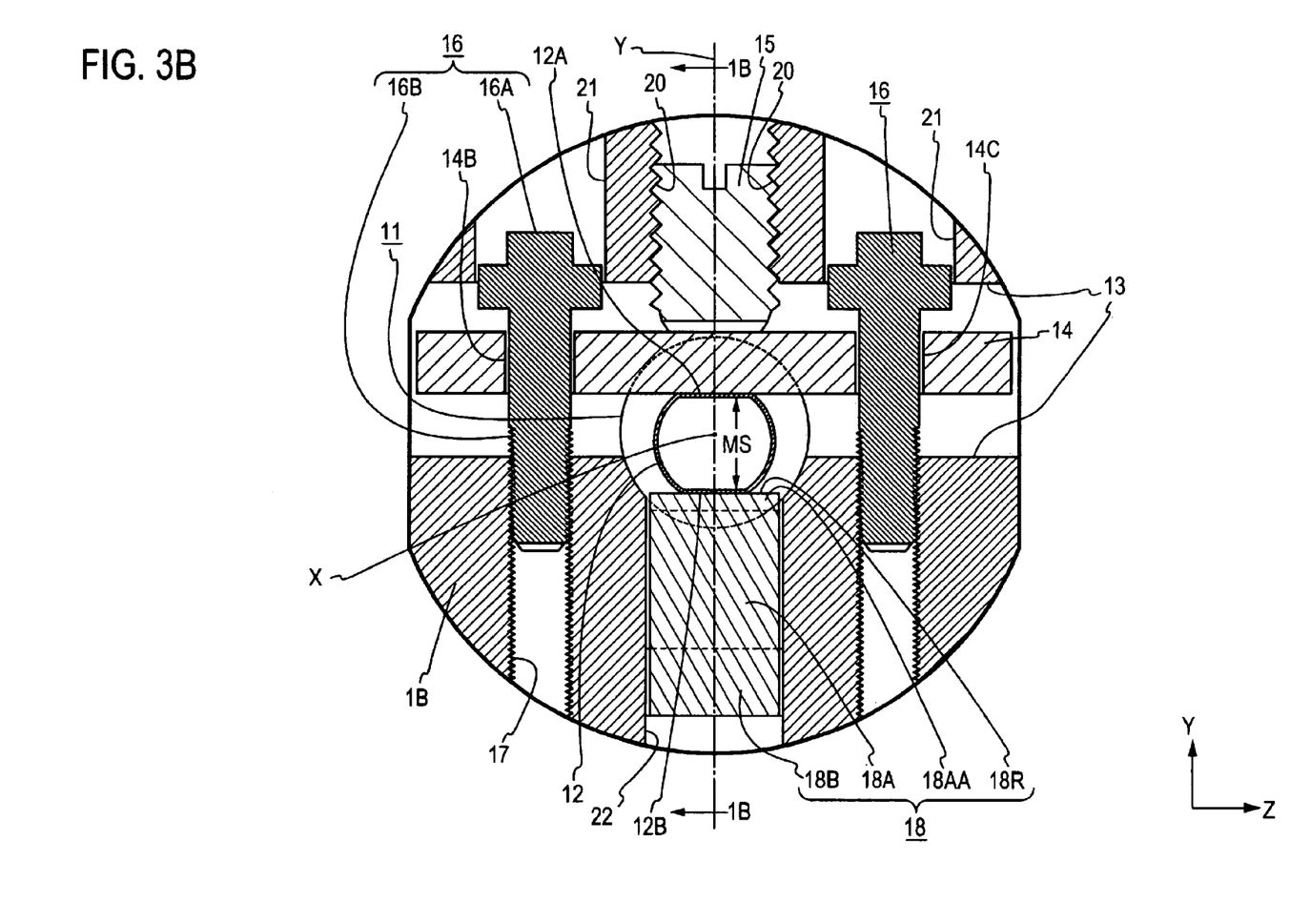
FIG. 3B is taken along the plane containing the Y and Z axes and perpendicular to the plane of the drawing and looking in the direction 3B in FIG. 1B to show the condition after the coarse adjustment operation has been conducted.
Figure 3C:
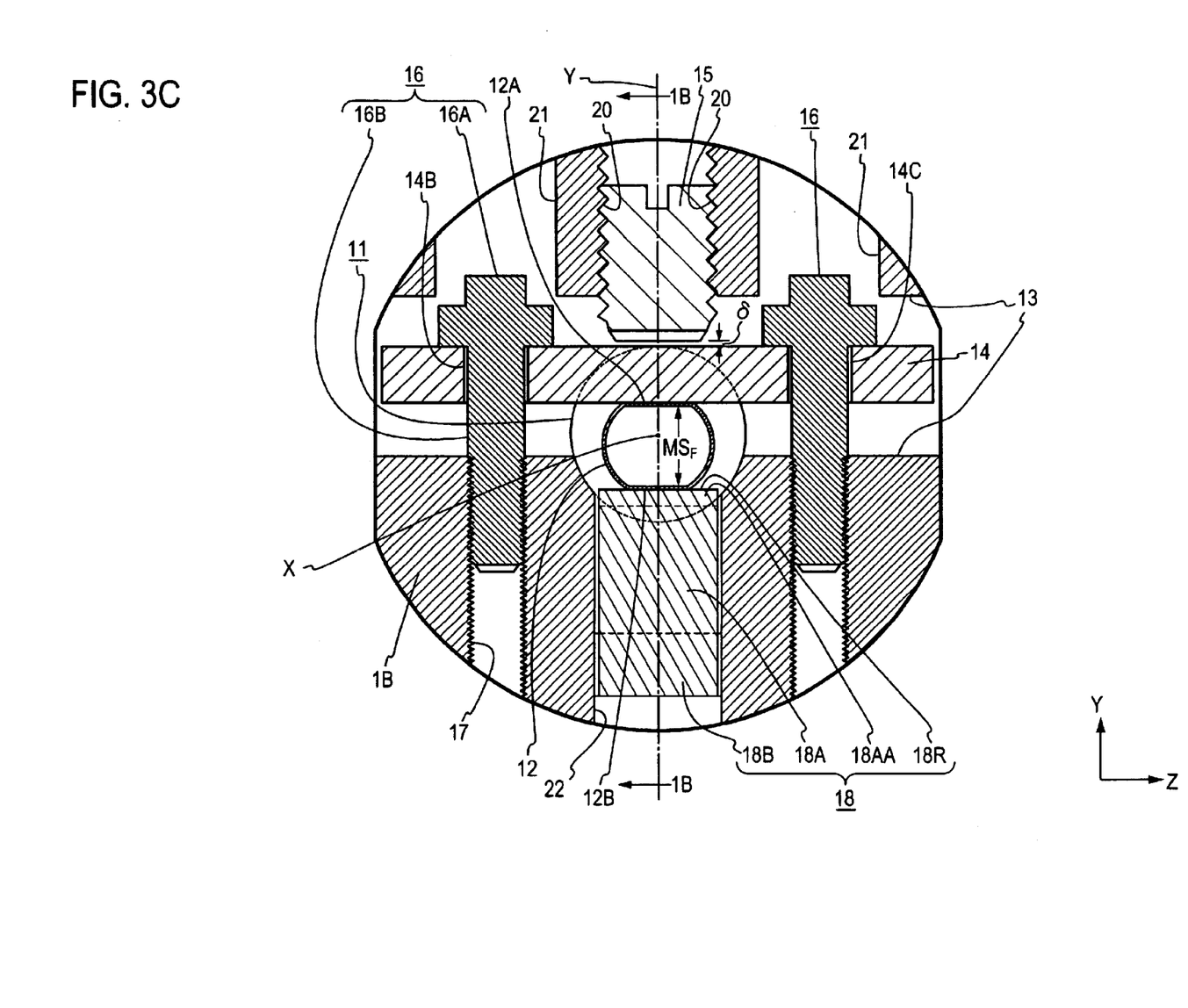

The coarse adjustment screw 15 and the head portions 16A of the fine adjustment screws 16 are recessed in the corresponding threaded hole 20 and the corresponding two screwdriving apertures 21, respectively as shown in FIGS. 3A–3C.

The metallic block 1 is further formed with an anvil mounting aperture 22 on a side of the pipe 12 opposite to the threaded hole 20 so as to align with and oppose to the coarse adjustment screw 15.

Figure 1B:
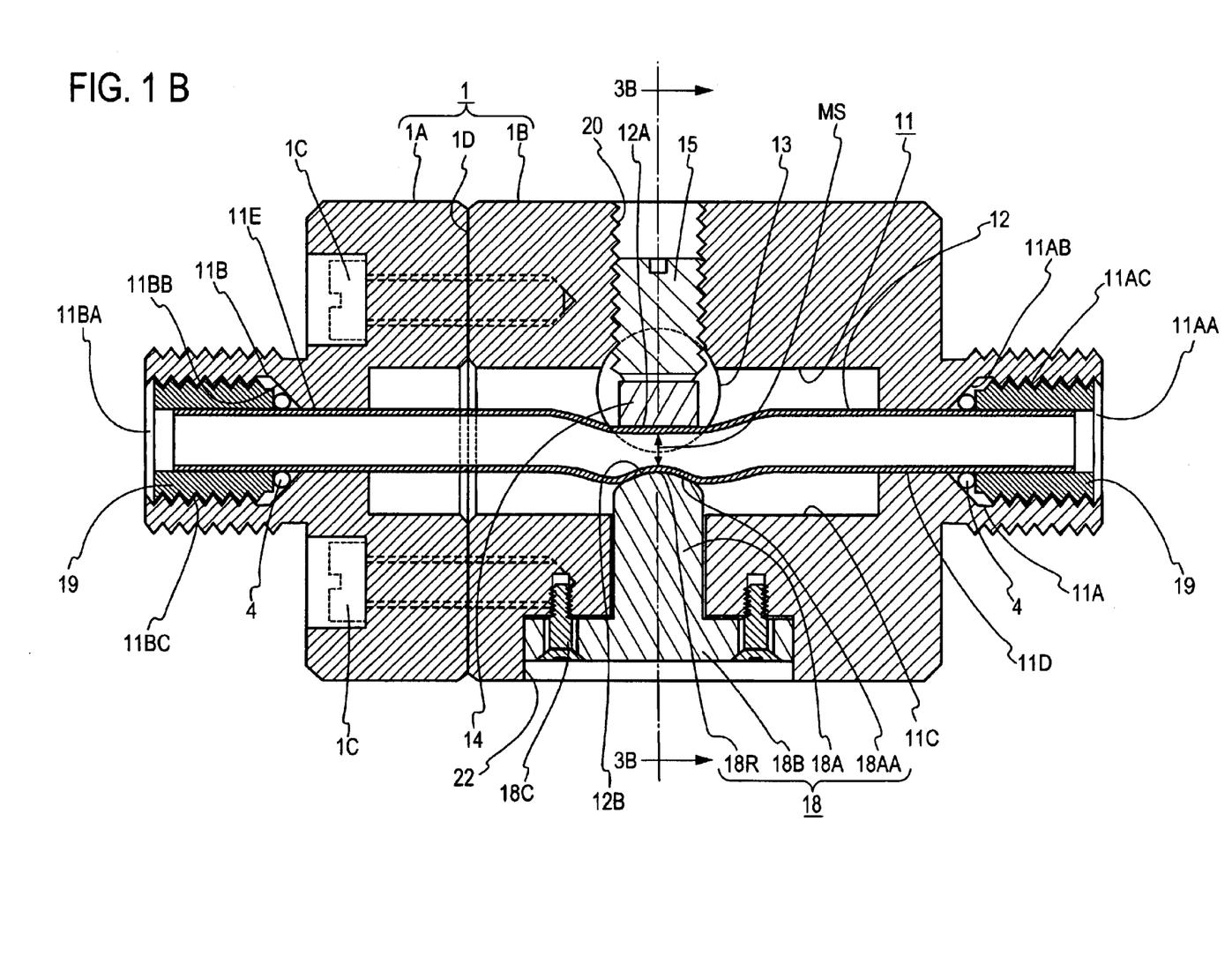

An anvil 18 is mounted in the anvil mounting aperture 22 and comprises an upstanding portion 18A and a base portion 18B which is secured to the metallic block 1 by means of screws 18C such that the upstanding portion 18A extends through the aperture 22 into the pipe receiving through-bore 11 to abut against the pipe 12 at a second abut portion 12B thereof, which is opposite to the first abut portion and opposes to the coarse adjustment screw. The upstanding portion 18A has an arcuate top surface 18AA. This top surface 18AA is curved in the X-axis direction of the pipe 12 with a top ridge 18R as shown in FIGS. 1A, 1B and oriented in a direction orthogonal to the cylindrical surface of the pipe such that as the pipe 12 is pressed against the anvil 18 by the pressing member 14 to abut at the first abut portion 12A of the pipe, an orifice decreasing in cross-sectional area progressively in the X axial direction of the pipe up to the minimum cross-sectional area, the distance of which is shown as MS (see FIGS. 1B and 3B) and then progressively increasing in cross-sectional area is formed.

FIGS. 1A and 3A show the condition prior to the commencement of the coarse adjustment operation wherein pressing or squeezing force is ready to be applied to the pipe 12. In this state, the coarse adjustment screw 15 is first threaded into the threaded hole 20 to squeeze the pipe 12 to have the distance MS between the first and second abut portions thereof at the ridge 18R on the upstanding portion 18A of the anvil 18 to thereby set the nozzle at a flow rate slightly higher than a desired flow rate, which performs the coarse adjustment operation as shown in FIG. 3B. As described before, it is to be noted that the diameter of the through-apertures 14B and 14C formed in the pressing member 14 is oversized relative to the diameter of the threaded shank portions of the fine-tuning screws 16 while the head portion of the screw 16 is oversized relative to the diameter of the through-apertures 14B and 14C, so that during the coarse adjustment, the pressing member 14 is pressed against the pipe 12 by the coarse adjustment screw 15 alone. (See FIG. 3B.)

Once the coarse adjustment has been completed, the fine adjustment screws 16 are threaded to conduct a fine adjustment operation. Since fine adjustment screws 16 have head portions 16A, it is possible to make the thread diameter of the threaded shank portion 16B smaller than the diameter of the threaded shank portion of the coarse adjustment screw 15. By way of example, assuming that the coarse adjustment screw 15 has a diameter of 6 mm, then the fine adjustment screws may be 3 mm in diameter at the respective threaded shank portions.

Since a thin screw having a small thread diameter is small in its thread pitch, it is possible to reduce the amount of deformation of the pipe 12 relative to the amount of rotation of the fine adjustment screws 16. In this regard, the coarse adjustment screw 15 having a diameter of 6 mm may have a thread pitch of 0.75 mm. In contrast, the fine adjustment screw 16 having a diameter of 3 mm would have a thread pitch of 0.35 mm. It is thus to be appreciated that the amount of displacement of a screw per unit angle of rotation is reduced with a decrease in the diameter of the screw, and that the small-diameter screw allows for adequate fine adjustment.

Moreover, since the two fine adjustment screws 16 are located at symmetrically distant positions 14B and 14C with equal distances from the center position 14A of the pressing member 14, when one of the fine adjustment screws 16 is threaded in, the pressing member 14 is moved in a lever-action with the other fine adjustment screw 16 as a pivot point to squeeze down the pipe 12.

Figure 5:
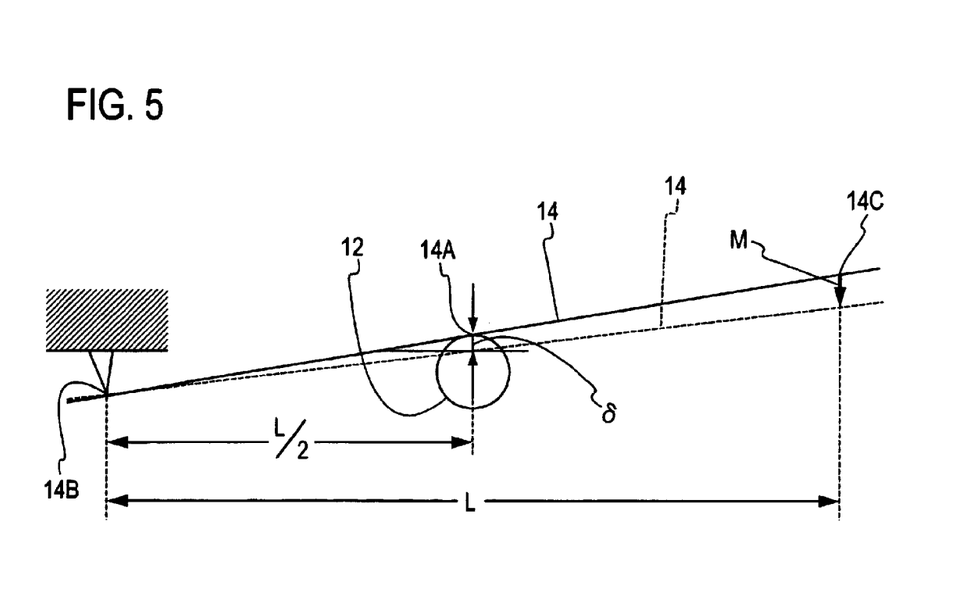
FIG. 5 is a diagrammatical view illustrating the principle of fine adjustment operation which forms the essential portion of the present invention by the use of the pressing member.

More specifically, as shown in FIG. 5, assuming that only the fine adjustment screw 16 inserted in the through-aperture 14C is turned with the other fine adjustment screw 16 inserted in the through-aperture 14B as a fixed fulcrum, for example and that the amount of pressing displacement caused by the screw at 14C is M, the total amount, δ of the displacement at the center position 14A of the pressing member 14 at which the pipe 12 is squeezed by the combination of the respective pressing forces due to the respective fine adjustment screws 16.

Accordingly, the displacement M at the point 14C will be reduced substantially ½ of M since the pipe 12 is positioned at substantially ½ of the length L of the line extending between the centers (represented by 14B and 14C) of the two fine adjustment screws 16. Consequently, the amount of displacement M by the fine adjustment screw 16 at the point 14C is further reduced to δ prior to being transmitted to the pipe 12, whereby the fine adjustment may be much more finely and easily facilitated.

According to the present invention, the coarse adjustment sets the orifice with a distance MS which is slightly larger than the desired value and the fine adjustment varies the distance MS to its finally desired value $MS_F$, so that it is easily prevented from over squeezing too a much smaller value.

It should be noted that in FIG. 5 the solid line shows the pressing member 14 being in the position prior to be subjected to the fine adjustment while the broken line shows the pressing member 14 being in the position after it has been subjected to the fine adjustment.

As the pipe 12 is pressed against the anvil 18 by the pressing member 14, the pipe 12 is deformed in conformity with the shape of the anvil 18 to form an orifice decreasing in cross-sectional area progressively in the axial direction of the pipe up to the minimum cross-sectional area with the finally desired distance $MS_F$ and then progressively increasing in cross-sectional area, so that the sonic flow rate may be obtained at the point of the minimum cross-sectional area (orifice), if the required conditions (the pressure on the primary side is above a predetermined value while the pressure on the secondary side is below the predetermined value) are satisfied. The sonic flow rate is maintained constant if the pressure on the primary side is above the predetermined level even though the pressure on the secondary side varies to a certain degree. It is thus to be appreciated that a highly reliable constant flow rate may be obtained if a target flow rate is set at the sonic flow rate.

As is appreciated from the foregoing descriptions, the provision of the fine adjustment screws in addition to the coarse adjustment screw according to the present invention facilitates the setting of a flow rate. Further, according to the present invention, since the coarse adjustment screw 15 and the fine adjustment screws 16 are recessed in the threaded hole 20 and the screwdriving apertures 21 formed in the metallic block 1, there is no risk of changing the set flow rate inadvertently or intentionally if the hole and apertures are closed by seals or the like once the flow rate has been set. Accordingly, it is to be understood that a particular set flow value may be maintained for a long period of time to thereby provide a highly reliable reference flow rate.

While the anvil 18 is shown as being removably mounted to the metallic block 1 and including the upstanding portion 18A having a top surface 18AA arcuate in cross-section as viewed in axial direction X of the pipe 12 as an example, it is to be understood that the shape of the orifice may be varied as desired by changing the cross-sectional shape of the top surface 18AA of the upstanding portion 18A to a different one.

What is claimed is:

1. A flow resistance setting nozzle comprising
   a metallic block having formed therethrough a pipe receiving through-bore;
   a metallic pipe for forming a flow path which is inserted in the pipe receiving through-bore;
   a pressing member in the form of a rectangular cross-section bar orthogonally abutting at a center position thereof with the pipe at a first abut portion thereof;
   a coarse adjustment screw mounted in the metallic block to press the pressing member at the center position thereof against the metallic pipe by a coarse adjustment force generated by the coarse adjustment screw;

an anvil having a distal end and mounted in the metallic block at a position opposite to the coarse adjustment screw such that the distal end of the anvil abuts the metallic pipe at a second abut portion thereof which is opposite to the first abut portion where the pipe abuts with the pressing member so that the pipe is received by and interposed between the pressing member and the anvil, whereby the pipe is squeezed by a coarse amount according to coarse adjustment force generated by the coarse adjustment screw;

two fine adjustment screws mounted in the metallic block to press the pressing member at two symmetrically distant positions thereof which locate with substantially equal distances in longitudinally opposite directions of the pressing member from the center position thereof against the metallic pipe by a fine adjustment force which is obtained from combination of respective pressing forces generated by the respective fine adjustment screws and which is additive to the coarse pressing force generated by the coarse adjustment screw, whereby the pipe is further squeezed by a fine amount according to the fine adjustment force; and seal means for forming seals between the outer peripheral surface of the metallic pipe and the inner peripheral wall of the pipe receiving through-bore formed in the metallic block.

2. The flow resistance setting nozzle according to claim 1, wherein the metallic block has a pressing member receiving bore which is formed therein to orthogonally intersect the pipe receiving through-bore, the pressing member is inserted in the pressing member receiving bore such that the pressing member orthogonally abuts with the pipe at the first abut portion.

3. The flow resistance setting nozzle according to claim 1, wherein each of the fine adjustment screws has a head portion and a threaded shank portion;

the pressing member has two through-apertures formed therethrough at the two symmetrically distant positions for loosely receiving the threaded shank portions of the corresponding fine adjustment screws therethrough; and the metallic block having two threaded holes which are coaxial with the two through-apertures and in which the threaded shank portions of the corresponding fine adjustment screws are threaded;

whereby the fine adjustment force is obtained from combination of the respective pressing forces imparted by the head portions of the fine adjustment screws to the pressing member as the threaded shank portions of the fine adjustment screws loosely fitted in the through-apertures of the pressing member are threaded into the threaded holes in the metallic block.

4. The flow resistance setting nozzle according to claim 2, wherein each of the fine adjustment screws has a head portion and a threaded shank portion;

the pressing member has two through-apertures formed therethrough at the two symmetrically distant positions for loosely receiving the threaded shank portions of the corresponding fine adjustment screws therethrough; and the metallic block having two threaded holes which are coaxial with the two through-apertures and in which the threaded shank portions of the corresponding fine adjustment screws are threaded;

whereby the fine adjustment force is obtained from combination of the respective pressing forces imparted by the head portions of the fine adjustment screws to the pressing member as the threaded shank portions of the fine adjustment screws loosely fitted in the through-apertures of the pressing member are threaded into the threaded holes in the metallic block.

5. The flow resistance setting nozzle according to claim 3, wherein each of the threaded shank portions of the fine adjustment screws has a diameter smaller than that of a threaded shank portion of the coarse adjustment screw.

6. The flow resistance setting nozzle according to claim 4, wherein each of the threaded shank portions of the fine adjustment screws has a diameter smaller than that of a threaded shank portion of the coarse adjustment screw.

7. The flow resistance setting nozzle according to claim 1, wherein the distal end of the anvil has an arcuate surface with a top ridge thereof oriented in a direction orthogonal to the longitudinal direction of the pipe so that the arcuate surface of the anvil intersects the cylindrical peripheral surface of the pipe as the second abut portion.

8. The flow resistance setting nozzle according to claim 2, wherein the distal end of the anvil has an arcuate surface with a top ridge thereof oriented in a direction orthogonal to the longitudinal direction of the pipe so that the arcuate surface of the anvil intersects the cylindrical peripheral surface of the pipe as the second abut portion.

9. The flow resistance setting nozzle according to claim 1, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block respectively.

10. The flow resistance setting nozzle according to claim 2, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

11. The flow resistance setting nozzle according to claim 3, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

12. The flow resistance setting nozzle according to claim 4, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

13. The flow resistance setting nozzle according to claim 5, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

14. The flow resistance setting nozzle according to claim 6, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

15. The flow resistance setting nozzle according to claim 7, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

16. The flow resistance setting nozzle according to claim 8, wherein the metallic block has a coarse threaded hole and two screwdriving apertures formed therein, and the respective head portions of the coarse adjustment screw and two fine adjustment screws are recessed in the coarse threaded hole and the two screwdriving apertures formed in said metallic block, respectively.

17. A flow resistance setting nozzle comprising a metallic block having formed therein
a pipe receiving through-bore,
a pressing member receiving bore,
a coarse threaded hole,
two screwdriving apertures,
two fine threaded holes, and
an anvil mounting bore;
a metallic pipe for forming a flow path;
a pressing member;
an anvil;
a coarse adjustment screw;
two fine adjustment screws; and
seal means;
wherein the pressing member receiving bore is extended to orthogonally intersect to the pipe receiving through-bore;

the coarse threaded hole is extended to orthogonally intersect to the pipe receiving through-bore and the pressing member receiving bore;

the anvil mounting bore is extended to orthogonally intersect to the pipe receiving through-bore in opposition to the coarse threaded hole;

the two screwdriving apertures are extended in parallel to the coarse threaded hole to orthogonally intersect to the pressing member receiving bore at symmetric positions with respect to the coarse threaded hole;

the two fine threaded holes are extended coaxially with the two screwdriving apertures to orthogonally intersect to the pressing member receiving bore;

the metallic pipe is inserted in the pipe receiving through-bore;

the pressing member is in the form of a rectangular cross-section bar having two spaced through-apertures at symmetric positions with respect to its center position and is inserted in the pressing member receiving bore to orthogonally abut at the center position thereof with the metallic pipe at a first abut portion thereof; the anvil is inserted in the anvil mounting bore to support the metallic pipe at a second abut portion opposite to the first abut portion as the pipe is pressed by the pressing member;

the coarse adjustment screw is threaded in the coarse threaded hole to press the pressing member at the center position thereof by a coarse adjustment force generated by the coarse adjustment screw against the metallic pipe to thereby squeeze the pipe by a coarse amount according to the coarse adjustment force;

each of the two fine adjustment screws comprises a head portion and a threaded shank portion which is loosely fitted in each the through-aperture in the pressing member and threaded into each of the two fine threaded holes to impart a further fine pressing force to the pressing member to thereby further squeeze the metallic pipe by a fine amount according to a fine adjustment force obtained from combination of the respective pressing forces generated by the respective fine adjustment screws; and the seal means forms air-tight sealing which allows the metallic pipe to be coupled to outer equipment outside of the metallic block.

* * * * *